United States Patent
Stepp et al.

(10) Patent No.: US 7,024,165 B2
(45) Date of Patent: Apr. 4, 2006

(54) ISM BAND TO U-NII BAND FREQUENCY TRANSVERTER AND METHOD OF FREQUENCY TRANSVERSION

(75) Inventors: Jeffrey David Stepp, Grandview, MO (US); Dale Hensley, Grandview, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 399 days.

(21) Appl. No.: 10/172,151

(22) Filed: Jun. 14, 2002

(65) Prior Publication Data

US 2003/0022652 A1 Jan. 30, 2003

Related U.S. Application Data

(60) Provisional application No. 60/298,218, filed on Jun. 14, 2001.

(51) Int. Cl.
*H04B 1/46* (2006.01)

(52) U.S. Cl. .......................... 455/81; 455/86; 455/553.1
(58) Field of Classification Search ..................... 455/8, 455/73, 78, 79, 80, 81, 85, 86, 552.1, 553.1
See application file for complete search history.

(56) References Cited

U.S. PATENT DOCUMENTS

| | | | |
|---|---|---|---|
| 4,079,415 A | | 3/1978 | Will |
| 4,219,758 A | * | 8/1980 | Karp .......................... 315/3.6 |
| 5,291,201 A | | 3/1994 | Endler et al. |
| 5,432,838 A | | 7/1995 | Purchase et al. |
| 5,463,261 A | * | 10/1995 | Skarda et al. ............... 307/131 |
| 5,548,839 A | | 8/1996 | Caldwell et al. |
| 5,797,084 A | * | 8/1998 | Tsuru et al. .................. 455/73 |
| 5,896,562 A | * | 4/1999 | Heinonen ..................... 455/76 |
| 5,949,382 A | * | 9/1999 | Quan ........................ 343/767 |
| 5,970,406 A | | 10/1999 | Komara |
| 6,125,266 A | * | 9/2000 | Matero et al. .............. 455/126 |
| 6,144,846 A | | 11/2000 | Durec |
| 6,195,047 B1 | * | 2/2001 | Richards .............. 343/700 MS |
| 6,438,358 B1 | * | 8/2002 | Higuchi ....................... 455/84 |
| 6,560,465 B1 | * | 5/2003 | Han ......................... 455/67.11 |
| 6,591,086 B1 | * | 7/2003 | Pleasant ...................... 455/78 |
| 6,594,479 B1 | * | 7/2003 | Ammar et al. ............. 455/347 |
| 6,609,010 B1 | * | 8/2003 | Dolle et al. .............. 455/552.1 |
| 2003/0013842 A1 | * | 1/2003 | Kroner et al. ............. 528/272 |

FOREIGN PATENT DOCUMENTS

| | | |
|---|---|---|
| JP | 53125708 | 11/1978 |
| JP | 54111710 | 9/1979 |
| JP | 54122822 | 9/1979 |
| WO | WO0052840 | 3/2000 |

\* cited by examiner

*Primary Examiner*—Nguyen T. Vo
*Assistant Examiner*—Nhan T. Le
(74) *Attorney, Agent, or Firm*—Hovey Williams LLP (57) ABSTRACT

A frequency transverter (10) and method for enabling bi-frequency dual-directional transfer of digitally encoded data on an RF carrier by translating between a crowded or otherwise undesirable first frequency band, such as the 2.4 GHz ISM band, and a less-crowded or otherwise desirable second frequency band, such as the 5.0 GHz–6.0 GHz U-NII band. In a preferred embodiment, the transverter (10) connects between an existing data radio (11) and its existing antenna (30), and comprises a bandswitch (12); an input RF isolating device (14); a transmuter (16); a converter (18); a dual output local oscillator (20); an output RF isolating device (22); and an antenna (24) tuned to the second frequency band. The bandswitch (12) allows for bypassing the transverter (10), thereby facilitating its use with legacy systems. The transmuter (14) and converter (16) are adapted to convert to and from, respectively, the second frequency band.

21 Claims, 7 Drawing Sheets

ISM BAND TO U-NII BAND FREQUENCY TRANSVERTER AND METHOD OF FREQUENCY TRANSVERSION

RELATED APPLICATIONS

The present application is related to and claims priority benefit of the filing date of a provisional application titled "ISMUNII Transverter", Ser. No. 60/298,218, filed Jun. 14, 2001, which is hereby incorporated by reference into the present application.

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to frequency translators and methods for translating a radio frequency (RF) signal between a first frequency band and a second frequency band. More particularly, the present invention concerns a frequency transverter and method for enabling bi-frequency dual-directional transfer of digitally encoded data on an RF carrier by translating between a first frequency band, such as the 2.4 GHz ISM band, and a second frequency band, such as the 5.0 GHz–6.0 GHz U-NII band.

2. Description of the Prior Art

Developments in a number of different digital technologies have greatly increased the need to transfer large amounts of data from one network or system to another. As a result, the 900 MHz and 2.4 GHz unlicensed frequencies are becoming increasingly overcrowded and congested. This is exacerbated by the fact that only three of the twelve DSSS channels assigned in the 2.4 GHz ISM band are usable simultaneously at 11 Mbps within a 1000 foot radius using an omni-directional antenna. Thus, fixed wireless local area networks (LANs), for example, involving digitally encoded data modulated onto an RF carrier signal in the 2.4 GHz ISM band, suffer increasing interference from a variety of devices, such as, for example, microwave ovens, cordless telephones, and Bluetooth apparatuses.

One solution to such overcrowding is to use a prior art frequency translator to translate the RF carrier signal between the 2.4 GHz ISM band and a second unlicensed band, such as, for example, the Unlicensed National Information Infrastructure (U-NII) band, thereby avoiding the congestion and interference. Certain sub-bands of the U-NII band are currently used primarily by U.S. government operations, particularly military radar operations. Other sub-bands are used as follows: 5.00–5.25 GHz is allocated on a primary basis to the aeronautical radionavigation, aeronautical mobile-satellite (R), fixed satellite and inter-satellite services for both government and non-government operations; 5.25–5.35 GHz is allocated on a secondary basis to the non-government radiolocation service; 5.650–5.925 GHz is allocated on a secondary basis to the amateur service; 5.725–5.875 GHz is designated for ISM applications and unlicensed Part 15 devices (radiocommunication services operating within this frequency range must accept harmful interference that may be caused by ISM applications); and 5.850–5.925 GHz is allocated on a primary basis to the fixed-satellite (Earth-to-space) service for non-government operations and to the radiolocation service for government operations.

Translating between the ISM and U-NII bands would facilitate, for example, connections among computers, televisions, appliance automation products, and on-premises network cable or telephone company access points within homes, schools, and health care facilities. Furthermore, recent technological developments now permit digitization and compression of large amounts of voice, video, imaging, and data information so as to allow for its rapid transmission from computers and other digital equipment within the network. Unfortunately, the ISM band is insufficient to allow for wireless transmission of this information within and among these networks. Translating these signals to the U-NII band, however, provides an immediate solution which accommodates existing WLAN and other legacy systems and allows for higher output powers.

Unfortunately, prior art frequency translators suffer from a number of problems and disadvantages, including, for example, that they are typically only two-terminal devices and require a different antenna for each frequency band. Furthermore, though the FCC precludes transmission at both frequency bands simultaneously, no provision is made to maintain a connection at the originating frequency. Additionally, up/down translation in prior art frequency translators between the first and second frequency bands can result in a phase noise which is undesirably higher than that of the signal's source, and can result in substantial undesirable spurious products. Additionally, it is well known that multipath levels cause increasing signal deterioration with increasing data rate, particularly at data rates of 10 Mb/s or greater. Thus, translating to 5 GHz using a prior art frequency translator results in an increase in propagation path loss which could degrade BER performance. Additionally, they typically do not accommodate or facilitate legacy systems. Yet another problem encountered when using prior art frequency translators involves potential interference resulting from band-sharing with other non-licensed services. Additionally, they are typically packaged undesirably near their RF or power source and away from the output antennas. Additionally, the circuitry of prior art frequency translators is typically constructed using a generic FR-4 PCB material which is undesirably lossy at 6 GHz, making it unsuitable for use in a U-NII band frequency translator.

Due to the above-identified and other problems and disadvantages in the art, a need exists for an improved frequency translator.

SUMMARY OF THE INVENTION

The present invention overcomes the above-described and other problems and disadvantages in the prior art by providing a frequency transverter and method for enabling bi-frequency dual-directional transfer of digitally encoded data on an RF carrier by translating between a first frequency band, such as the 2.4 GHz ISM band, and a second frequency band, such as the 5.0 GHz–6.0 GHz U-NII band.

In a preferred embodiment, the transverter connects between a conventional data radio and its existing antenna, and comprises a three-terminal bandswitch; a three-terminal input RF isolating device; a three-terminal transmuter; a three-terminal converter; a dual output local oscillator; a three-terminal output RF isolating device; and an antenna. The three-terminal bandswitch allows for selectively connecting the data radio either to the existing antenna at the first frequency band or to the input RF isolating device of the transverter. This selectivity facilitates compatibility with existing legacy systems operating at 2.4 GHz by allowing the user to effectively bypass the transverter when desired.

The three-terminal input RF isolating device electrically isolates the transmuter and the converter from the data radio. The input RF isolating device exhibits third order symmetry behavior that allows the RF signal to flow with low loss from a first port acting as an input terminal to a second port acting as an output terminal. If the RF signal is then incident on the second port, it flows with low loss to a third port allowing for a bidirectional flow and high loss back to the first port, thereby providing isolation. A standard narrowband design is used, rather than a broadband multi-octave band design, to reduce the lower frequency spurious elements from the input RF signal.

The three-terminal transmuter is operable to perform several functions, including allowing for adjusting through-put gain; transmuting or up-converting the input RF signal from the first frequency band to the second frequency band; filtering low power undesirable signals, image signals created during frequency conversion, and higher order mixing products resulting from interactions with circuit non-linearities; boosting an input power to a higher output power; and filtering the increased output power to reduce spurious output above the second frequency band due to non-linearity arising from power amplification.

The three-terminal converter performs several functions, including translating or down-converting a received signal from the second frequency band to the first frequency band; reducing the noise figure of the receiver input of the data radio at the second frequency band; filtering low power undesirable signals, image signals created during frequency conversion, and higher order mixing products arising from interactions with circuit non-linearities; filtering the converted received signal to reduce spurious input seen by the existing data radio outside the second frequency band; and matching the gain of the incoming received signal to the existing data radio.

The dual output local oscillator performs several functions, including providing a high drive level to both the transmuter and the converter to reduce conversion loss; providing an appropriate summing frequency to both the transmuter and the converter; increasing the isolation between the transverter and the converter; and allowing for the selectability and programmability of the fundamental frequency, thereby expanding the number of frequency bands that can be covered with the transverter. With regard to hardware, only the filters need be changed to an appropriate pass-band in order to accommodate different frequency bands.

The local oscillator is operable to set the Local Oscillator frequency which determines how the ISM band is translated up/down to the U-NII band. This fundamental frequency is both selectable and programmable, thereby expanding the number of frequency bands that can be covered with the transverter.

The three-terminal output RF isolating device electrically isolates the data radio from the receive signal. Furthermore, because amplifiers exposed to high load VSWRs will typically experience degradation in their linearity characteristics, the output RF isolating device also serves to isolate an amplifier stage of the transmuter from a large load VSWR.

The antenna is tuned to the second frequency band. The transverter is able to use a single antenna to both transmit and receive because minimal isolation is required due to built-in time offset of time division duplex (TDD) operation.

With regard to construction of the transverter, preferably all circuitry is integrated except the reference oscillator, the RF bandpass filters, and the power amplifier. The ICs are preferably constructed using an SiGe process, a robust SiGe 0.8 μm BiCMOS process, an SiGe HBT-CMOS process, an SiGe:C process, or an SiC process. The substrate material for the circuitry is preferably constructed of ceramic PTFE or another comparable product with a comparable dielectric constant, which reduces the loss tangent by a factor of twelve, from 0.027 to 0.0023, when compared to prior art frequency translators.

It will be appreciated that the transverter of the present invention provides a number of substantial advantages over prior art frequency translators, including making advantageous use of the U-NII band, which increases channel utilization and reuse, mitigates interference from other wireless devices, reduces adjacent channel interference (ACI), and allows for smaller antenna dimensions. Additionally, whereas prior art frequency translators were limited to three channels in simultaneous use at 11 Mbps within a 1000 foot radius using an omni-directional antenna, the transverter advantageously provides more spectrum (300 MHz) and more power and allows for simultaneous use of more than three co-located channels per layer. The transverter advantageously boosts the output power of the existing RF signal from the data radio up to 1 Watt, as allowed for by the FCC, which allows for an increase in transmission range at the second frequency band. Additionally, the transverter advantageously avoids propagation path loss, which could otherwise degrade BER performance, by providing a reduced noise figure in the 5.7 GHz down-converter front end. Additionally, the transverter advantageously provides a phase noise which is lower than that of the data radio, employs additional filtering to minimize spurious products, and uses an oscillator that is significantly more temperature stable than is used in the prior art. Additionally, power reduction criteria are imposed upon directional antennas with a gain above 6 dBi to reduce the potential for multiple devices to compete for spectrum in overlapping areas. Additionally, the transverter connects between an existing data radio and its existing antenna and is therefore advantageously useable with legacy systems without substantial modification. Additionally, whereas the electronic circuitry of prior art translators is packaged near their RF or power source and away from the output antennas, the transverter can be packaged in a housing that also serves as a ground plane of the second frequency band antenna. Additionally, whereas the circuitry of prior art frequency translators is typically constructed using a generic FR-4 PCB material which is undesirably lossy at 6 GHz, the circuitry of the transverter is constructed using a ceramic PTFE substrate material or other material having a comparable dielectric constant. This advantageously reduces the loss tangent by a factor of 12, from 0.027 down to 0.0023. Relatedly, the widths of the RF lines are scaled according to the thickness and permittivity of the substrate material to result in 50 Ohm transmission lines.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Referring to the figures, a frequency transverter 10 is shown constructed in accordance with a preferred embodiment of the present invention. The transverter 10 enables bi-frequency dual-directional transfer of digitally encoded data on an RF carrier by translating or shifting both transmit and receive signals between two different bands with a nominal separation in frequency and time but not limited to equal spectrum bandwidths. Thus, the transverter is operable, for example, to translate a transmit RF signal from a first crowded or congested band to a second frequency band with less interference, and to translate a receive RF signal from the second frequency band to the first frequency band, thereby completing the communication channel.

In a preferred embodiment, the transverter 10 is used to translate transmit and receive signals between the 2.4 GHz ISM band associated, for example, with Bluetooth, 802.11 b compliant devices, and FHSS systems, and the 5.1 GHz, 5.2 GHz, and 5.7 GHz U-NII bands without modifying the signals' existing modulation scheme, data rate (up to 11 MB using the IEEE 802.11b standard), or link processing. Thus, the transverter 10 provides additional spectrum for wideband operation which facilitates, for example, inexpensive broadband wireless networks. The only requirement is that the input signal have time division duplex (TDD) characteristics (i.e., achieves a spatially selective transmission that is reciprocal in the uplink and downlink channels).

Figure 1:
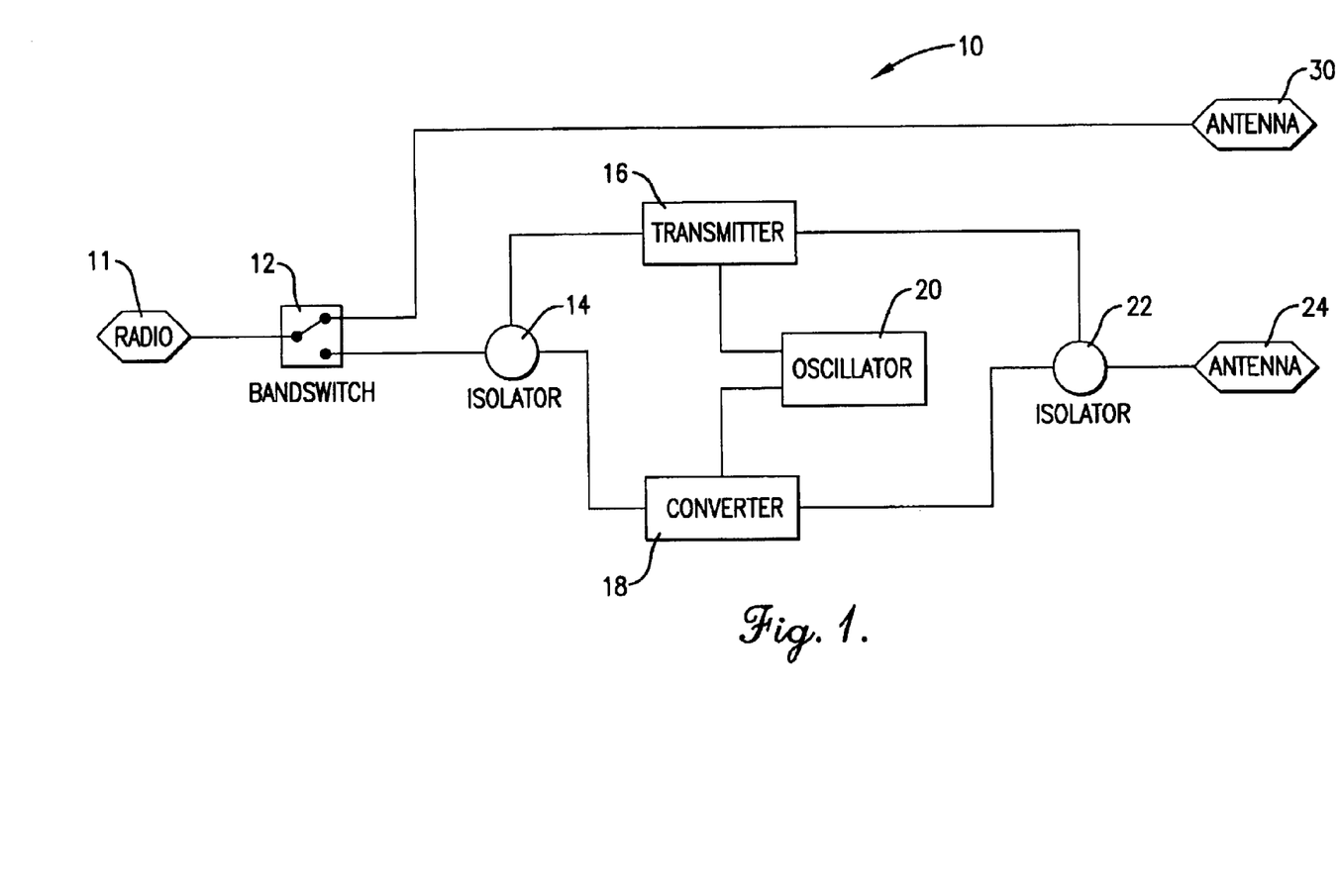
FIG. 1 is a block diagram of a preferred embodiment of the frequency transverter of the present invention.

As disclosed herein, the transverter 10 connects between a conventional data radio 11 and its existing antenna 30, making it advantageously usable with legacy systems. The transverter 10 is particularly suited for use in, for example, the fixed wireless LAN after-market wherein the data radio 11 is a commonly available 2.4 Ghz DSSS radio using, for example, the Intersil PRISM chipset, which links the transverter 10 to the LAN to effectively convert the 2.4 GHz data radio 11 to a 5.2 GHz or 5.8 GHz data radio having an extended range. Referring particularly to FIG. 1, the transverter 10 comprises a three-terminal bandswitch 12; a three-terminal input RF isolating device 14; a three-terminal transmuter 16; a three-terminal converter 18; a dual output local oscillator 20; a three-terminal output RF isolating device 22; and an antenna 24.

With the transverter 10 interposed between the data radio 11 and the existing antenna 30, the three-terminal bandswitch 12 is operable to allow a user to selectively connect the data radio 11 either to the existing antenna 30 at the existing antenna frequency set or to the input RF isolating device 14 of the transverter 10. This selectivity facilitates compatibility with existing legacy systems operating at 2.4 GHz by allowing the user to effectively bypass the transverter 10 when desired.

The bandswitch 12 is located at the input of the transverter 10 to take advantage of higher isolation characteristics at lower frequencies. The bandswitch 12 is preferably a single-pull double-throw (SPDT) absorptive switch which includes an input terminal, a first output terminal, and a second output terminal, and which provides low insertion loss, high linearity, and good isolation between the two frequency bands. The input terminal is connected to the transmitter/receiver port of the data radio 11 to allow for communicating input and output RF signals therebetween. The first output terminal is connected to the existing 2.4 GHz antenna 30. The second output terminal is connected to the input RF isolating device 14.

A one-bit control line and an associated driver is used to control to which of the first or second output terminals the input RF signal is directed. A first state directs the input RF signal to the first output terminal and the existing 2.4 GHz antenna 30, and a second state directs the input RF signal to the second output terminal and the input RF isolating device 14.

The three-terminal input RF isolating device 14 is operable to electrically isolate the transmuter 16 and the converter 18 from the data radio 11. The data radio 11 uses a time division duplex (TDD) operation which incorporates a built-in time offset between the transmit and receive time slots. The data radio 11 also incorporates a T/R switch to achieve the necessary isolation between the receiver and the transmitter's power. Typical values are 20 dB. This allows for relaxing the transverter's isolation to include the input RF isolating device 14 and the output RF isolating device 22. This two-terminal block can then have a minimal 15 dB to 20 dB of isolation. The only other limit to the transmitter/receiver isolation will be the maximum transmit VSWR allowed by the data radio 11, which is determined by the maximum transmit power allowed to reflect into the data radio 11.

The input RF isolating device 14 is preferably a Y-junction ferrite device configured as a three-port circulator device used to provide a non-reciprocal effect. The input RF isolating device 14 exhibits third order symmetry behavior that allows the RF signal to flow with low loss from a first port acting as an input terminal to a second port acting as an output terminal. If the RF signal is then incident on the second port, it flows with low loss to a third port allowing for a bidirectional flow and high loss back to the first port, thereby providing isolation. A standard narrowband design is used, rather than a broadband multi-octave band design, to reduce the lower frequency spurious elements from the input RF signal. A drop-in microstrip design is used to ease placement directly on the substrate material because the output power is low for the ferrite material.

As indicated, the input RF isolating device 14 includes an input terminal, a first output terminal, and a second output terminal. The first input terminal is connected to the second output terminal of the bandswitch 12. The first output terminal is connected to the transmit input terminal of the transmuter 16. The second output terminal is connected to the receive output terminal of the converter 18.

The three-terminal transmuter 16 is operable to perform several functions, including allowing for adjusting throughput gain; transmuting or upconverting the input RF signal from the first frequency band to the second frequency band; filtering low power undesirable signals, image signals created during frequency conversion, and higher order mixing products resulting from interactions with circuit non-linearities; boosting an input power to a higher output power; and filtering the increased output power to reduce spurious output above the second frequency band due to non-linearity arising from power amplification.

The transmuter 16 includes a first input terminal, a second input terminal, and an output terminal. In more detail, referring also to FIG. 2, the transmuter 16 includes a two-terminal attenuator 36; a three-terminal frequency conversion device 38; a two-terminal lower power bandpass filter 40; an amplifier stage 42; and a two-terminal high power low-pass filter 44. The first input terminal connects the first output terminal of the input RF isolating device 14 to the attenuator 36. The attenuator 36 is operable to allow for adjusting throughput gain between the first input terminal and the second input terminal. The attenuator 36 is also operable to provide a broadband match for both the input RF isolating device 14 and the data radio's transmitter output to ensure signal linearity at the amplifier stage 42. The attenuator 36 is preferably a 10 dB or larger attenuator, which is dependent upon the frequency gain of the antenna 24 being larger than 6 dB. For each dB larger than 6 dB, the attenuator 36 is set to that value over 10 dB to lower the throughput gain by the same amount. Such a lowering of the throughput gain is a requirement of the FCC. This allows for limiting the field strength emission to a maximum value, and allows for using antennas with various gains for the second frequency band. The attenuator 36 outputs to a low frequency IF input of the frequency conversion device 38. The frequency conversion device 38 is operable to transmute a band of frequencies from a lower set (e.g., the first frequency band) to a higher set (e.g., the second frequency band). The frequency conversion device 38 includes a double-balanced mixer of sufficient drive power, typically on the order of +13 dBm, to minimize any conversion loss to less than 10 dB.

Figure 2:
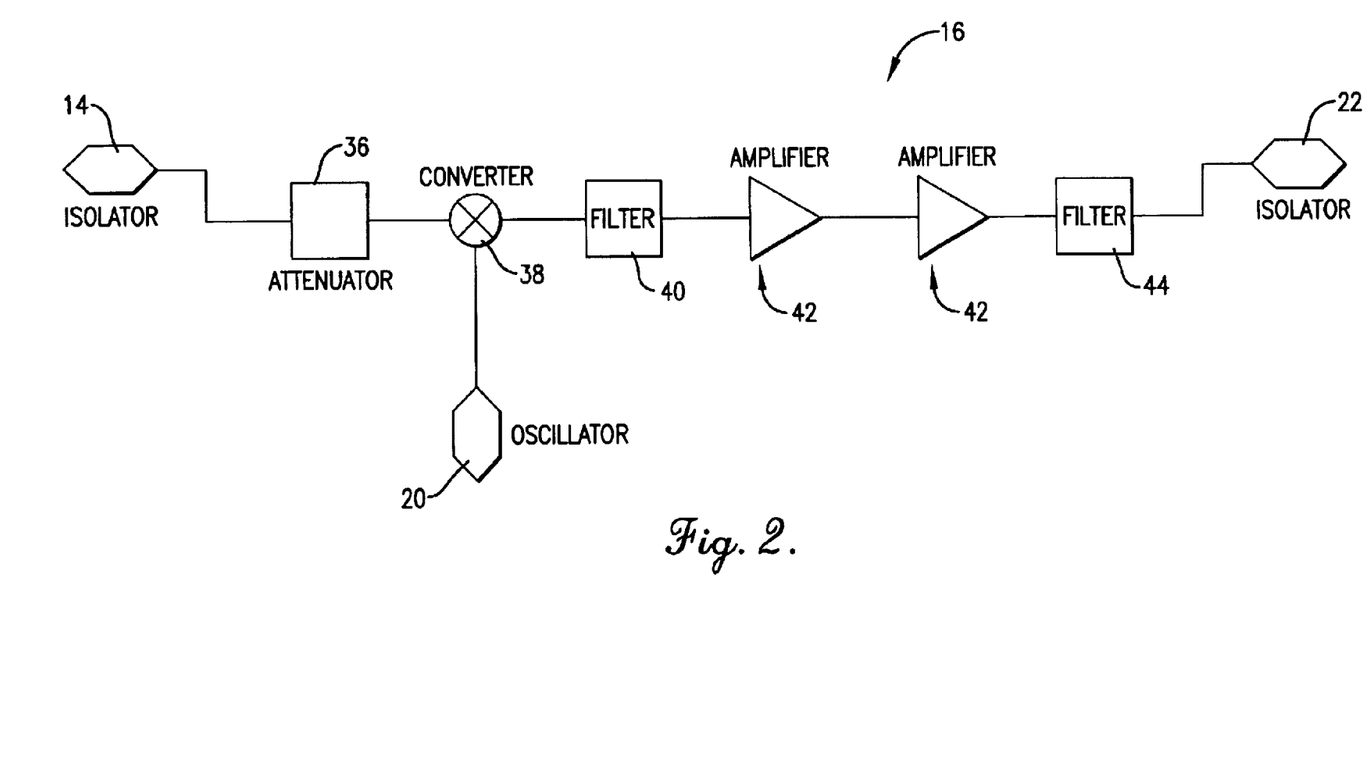
FIG. 2 is a block diagram of a transmuter component of the frequency transverter of FIG. 1.

The second input terminal connects the first output terminal of the dual output local oscillator 20 to a local oscillator input of the frequency conversion device 38. A high frequency RF output of the frequency conversion device 38 is connected to the input of the bandpass filter 40. The bandpass filter 40 is operable to filter low power undesirable signals, image signals created by the frequency conversion stage, and higher order mixing products in the frequency conversion device 38 interacting with circuit non-linearities. The bandpass filter 40 is located prior to the amplifier stage 42 in order to minimize the bandpass filter's required power rating and cost. The output of the bandpass filter 40 is connected to the input of the amplifier stage 42.

The amplifier stage 42 is operable to increase the input RF signal's strength to that allowed for by the U-NII band. With regard to construction of the amplifier stage 42, a GaAs device may be the best choice for providing the required 1 Watt output power and for the additional linearity. Depletion-mode GaAs processes are commonly chosen for power amplifier designs because of their excellent RF performance. Due to depletion mode structure, however, a negative voltage is required for the gate bias, which, if not already available in the system hardware design, must be generated externally from the power amplifier. The output of the amplifier stage 42 is connected to the input of the high power low-pass filter 44.

The low-pass filter 44 is operable to filter the increased output power to reduce spurious output above the different frequency set due to non-linearity in the power amplifier stage 42. Because the low-pass filter 44 is located following the amplifier stage 42, it must have a higher power rating, but can be of simpler and lower cost construction.

Thus, the transmuter 16 uses the bandpass filter 40 to attenuate all spurious mixing products from the double-balanced mixer of the frequency conversion device 38, and uses the low-pass filter 44 to attenuate the harmonics from the amplifier stage 42. The restricted band emission must be limited to 53.26 dB, which sets the mixer output filter order to three to ensure that the LO rejection at 3.3 GHz from the mixer is attenuated sufficiently. The harmonic filter order is determined by the additional filtering of the second harmonic of the amplifier stages 42. Typically, they are 30 dB down, so a fifth order filter is required that can handle 1 W of power.

The output terminal connects the output of the low-pass filter 44 to the second output of the output RF isolating device 22.

The three-terminal converter 18 is operable to perform several functions, including translating or down-converting a received signal from the second frequency band to the first frequency band; reducing the noise figure of the receiver input of the data radio at the second frequency band; filtering low power undesirable signals, image signals created during frequency conversion, and higher order mixing products arising from interactions with circuit non-linearities; filtering the converted received signal to reduce spurious input seen by the existing data radio 11 outside the second frequency band; and matching the gain of the incoming received signal to the existing data radio 11.

The converter 18 includes a first input terminal, a second input terminal, and an output terminal. In more detail, referring also to FIG. 3, the converter 18 includes a two-terminal bandpass filter 50; a low noise amplifier (LNA) stage 52; a three-terminal frequency conversion stage 54; a two-terminal low-pass filter stage 56 a two-terminal amplifier stage 57; and a two-terminal attenuator 58.

Figure 3:
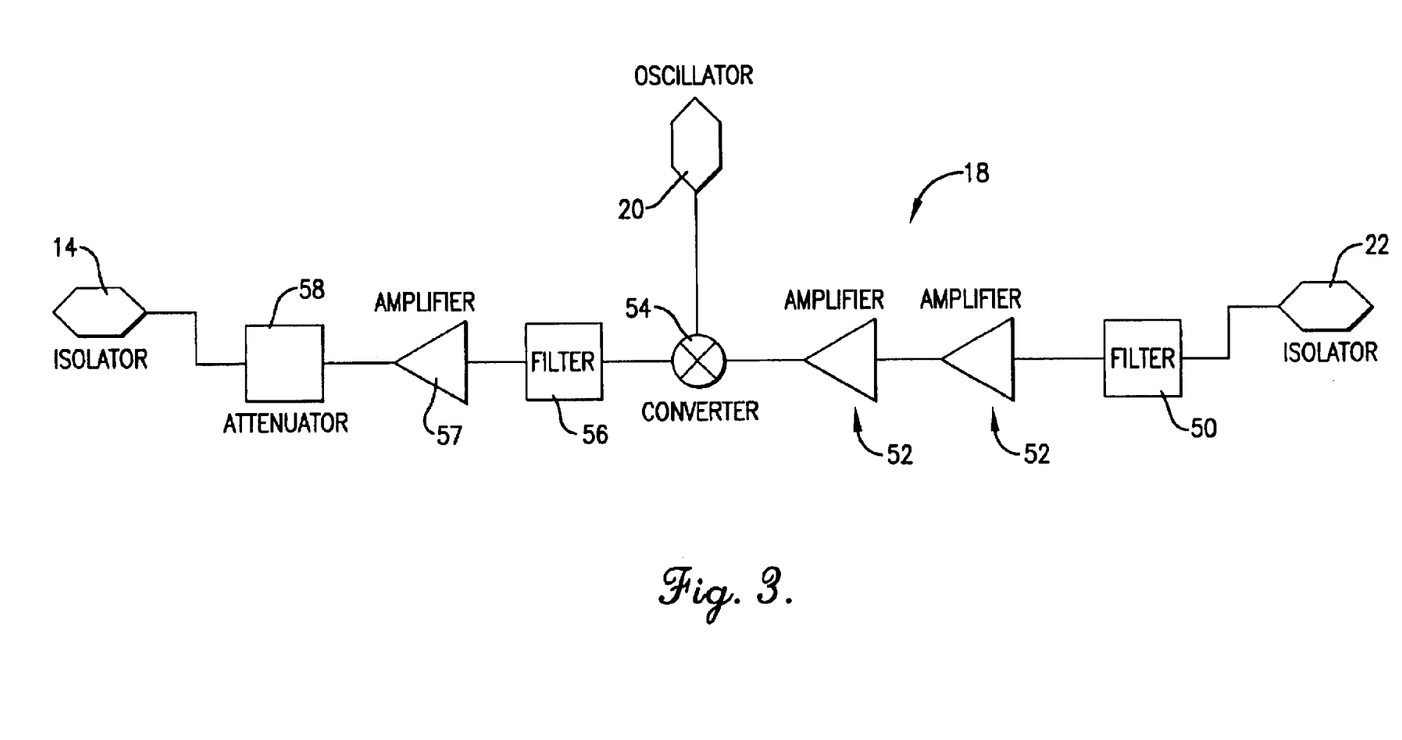
FIG. 3 is a block diagram of a converter component of the frequency transverter of FIG. 1.

The first input terminal connects the first output of the output RF isolating device 22 to the input of the bandpass filter 50. The bandpass filter 50 is an image-reject pass-band filter appropriate for the second frequency band, and operable to filter low power undesirable signals, image signals created by the frequency conversion stage 54, and higher order mixing products in the frequency conversion stage 54 interacting with circuit non-linearities. Thus, the bandpass filter 50 is operable to reduce spurious signals at the image frequency of the frequency conversion stage 54, out-of-band radiator signals that might cause interference, and any other undesirable signals emanating from the received signal's source. The bandpass filter 50 is also operable to limit the noise bandwidth of the LNA stage 52. The bandpass filter 50 must have the same pass-band frequency and bandwidth as the transmuter 16 to be compatible with TDD operation. The output of the bandpass filter 50 is connected to the input of the LNA stage 52.

The LNA stage 52 includes a number of sub-stages and is operable to reduce the noise figure of the receiver input of the data radio 11 at the second frequency band by providing a lower noise input device and additional gain at the second frequency band. The noise figure and the associated gain are important considerations when choosing the LNA. The noise figure of the first sub-stage of the LNA stage 52 sets an initial sensitivity level, and the noise figure of each following sub-stage degrades this sensitivity but is mitigated by the preceding gain. The devices selected for the LNA stage 52 must be capable of providing a somewhat lower noise figure than the LNB system requirement, and must provide sufficient gain to mask the noise contribution from the mixer and IF amplifier. If the mixer has a 7 dB noise figure and its contribution to the cascade is to be negligible (<0.05 dB), then at least 25 dB gain is required in the LNA stage 52. To account for the added path loss at the higher frequency, and to keep the noise figure of the data radio 11 from, being degraded, the 5.7 GHz LNA must have its noise figure lower by at least 2 dB. The additional path loss is −3.74 dB. For higher frequencies, larger propagation losses can be offset by choosing an LNA having a correspondingly lower noise figure. Because a first generation data radio has a cascaded noise figure of 6.8 dB and an intercept point of −17 dBm, the degradation in system performance is limited too. A second generation data radio has a slightly reduced receiver dynamic performance at −22 dBm Input IP3.

For these reasons, the LNA is preferably a pHEMT device with excellent low-noise characteristics at microwave frequencies. This allows the cascaded noise figure of the transverter 10 to be several dB below the data radio 11, and reduces the path loss of the different frequency band to be nearly the same as the original path loss. The output of the LNA stage 52 is connected to the high frequency RF port of the frequency conversion stage 54.

A disadvantage involved in translating to 5 GHz involves an increase in propagation path loss which can potentially degrade BER performance. Care must be taken to ensure that this difference is accounted for in a reduced noise figure in the 5.7 GHz down-converter front end. For this reason, the noise figure of the converter 18 is matched to the path loss difference between the input and output bands by:

$$NF_{cascaded}(\text{transverter}) = NF_{cascaded}(\text{data radio}) - 10*\text{Log}(Fup/Fdown),$$

where Fup and Fdown are the channel frequencies. The gain of the converter 18 is then matched to zero at the output to maintain the same maximum input to the data radio's receiver to minimize overloading the front end and maintain the linearity. DSSS systems solve the multipath problem by using receivers with linear front ends and employing some form of channel equalization. The Prism II radio, for example, includes an equalizer for delay speeds of greater than 100 ns in order to improve the multipath distortion performance from 45 ns to 100 ns. The bandpass filters at the front end have a group delay specified as 5 ns maximum over their passband to ensure minimal distortion over the channel bandwidth.

The frequency conversion stage 54 is operable to translate the received signal from the second frequency band to the first frequency band used by the data radio 11. The frequency conversion stage 54 of the converter 18 is substantially identical to the frequency conversion stage 38 of the transverter 16, described above.

The second input terminal is connected to the second output of the dual-output local oscillator 20 and to the local oscillator port of the frequency conversion stage 54. The low frequency IF port of the frequency conversion stage 54 is connected to the input of the low-pass filter stage 56. The low-pass filter stage 56 is operable to filter the converted received signal to reduce spurious input seen by the data radio 11 outside the second frequency band. The low-pass filter stage 56 is located following the frequency conversion stage 54 to reduce the image frequency and higher order mixing products.

The output of the low-pass filter stage 56 is connected to the input of the two-terminal amplifier stage 57. The two-terminal amplifier stage 57 is operable to improve the receive noise figure. The output of the two-terminal amplifier stage 57 is connected to the input of the two-terminal attenuator 58. The attenuator 58 is operable to reduce the total gain through the converter 18. The converter output terminal connects the output of the two-terminal attenuator 58 to the output terminal of the second RF isolating device 22.

The dual output local oscillator 20 is operable to perform several functions, including providing a high drive level to the LO ports of the frequency conversion stages 38,54 of both the transmuter 16 and the converter 18 to reduce conversion loss; providing an appropriate summing frequency to the frequency conversion stages 38,54 of both the transmuter 16 and the converter 18; increasing the isolation between the transverter LO and the converter LO; and allowing for the selectability and programmability of the fundamental frequency, thereby expanding the number of frequency bands that can be covered with the transverter 10. With regard to hardware, only the filters need be changed to an appropriate pass-band in order to accommodate different frequency bands.

Figure 4:
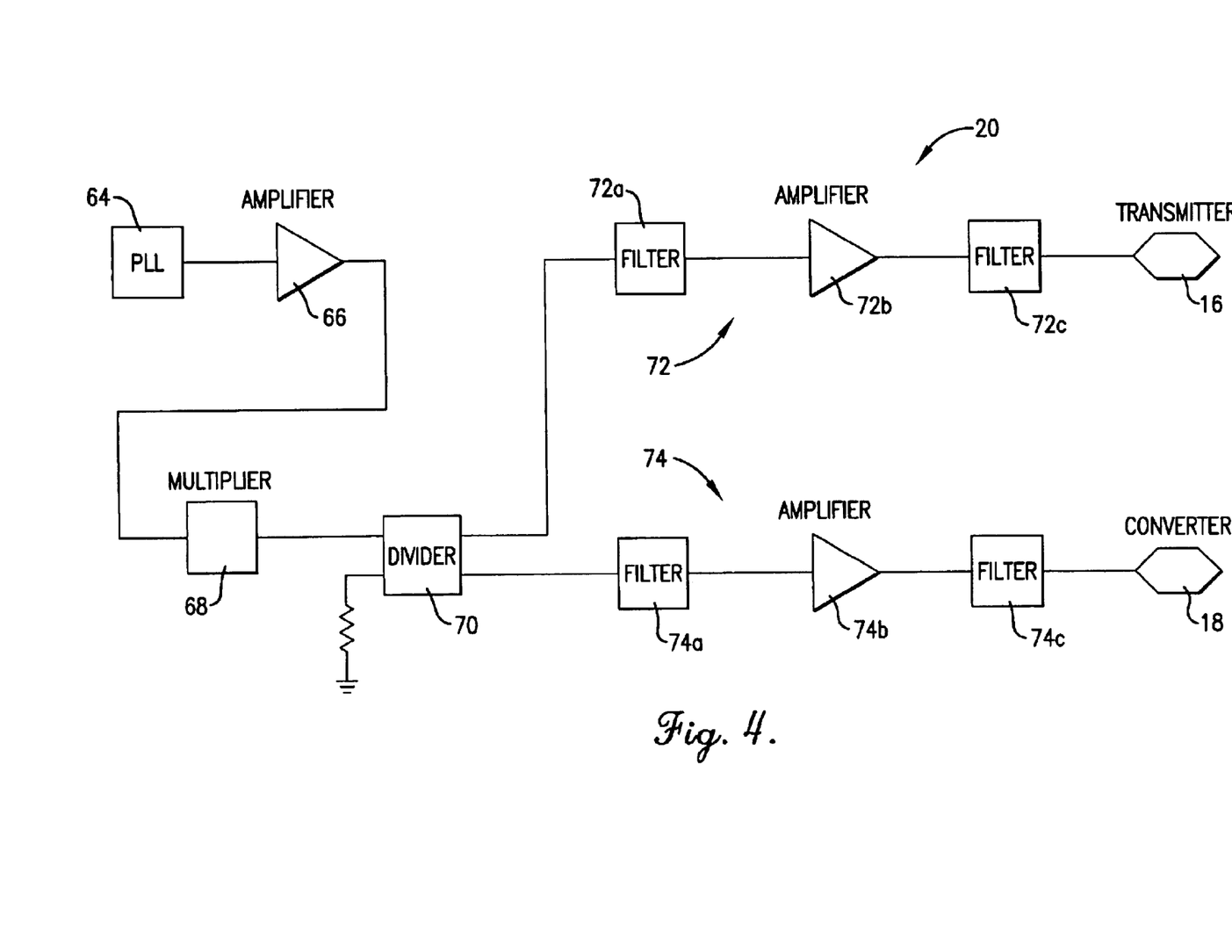
FIG. 4 is a block diagram of a multiplier portion of a local oscillator component of the frequency transverter of FIG. 1.
Figure 5:
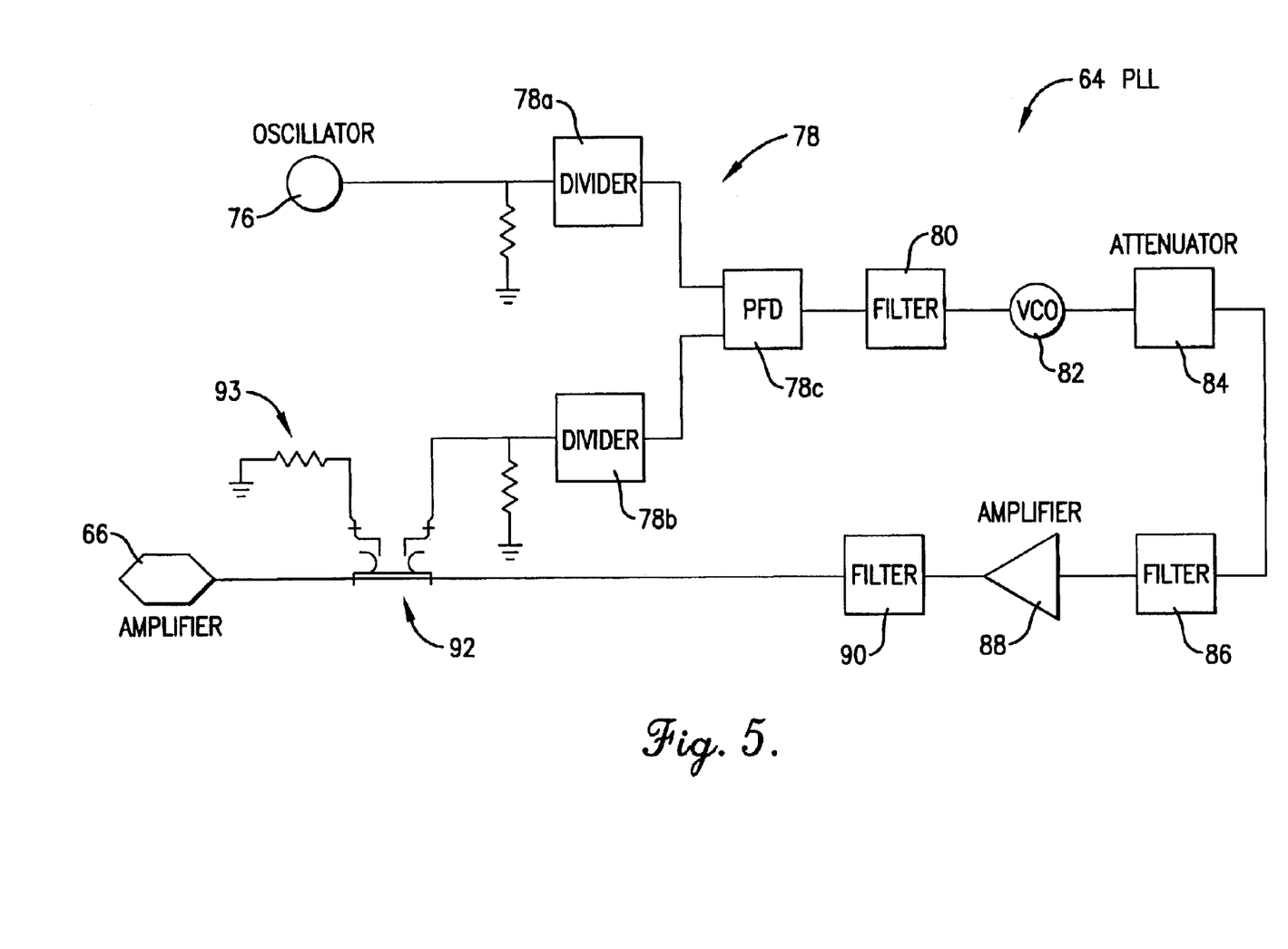
FIG. 5 is a block diagram of a fundamental phase-locked-loop portion of the local oscillator component.
Figure 6:
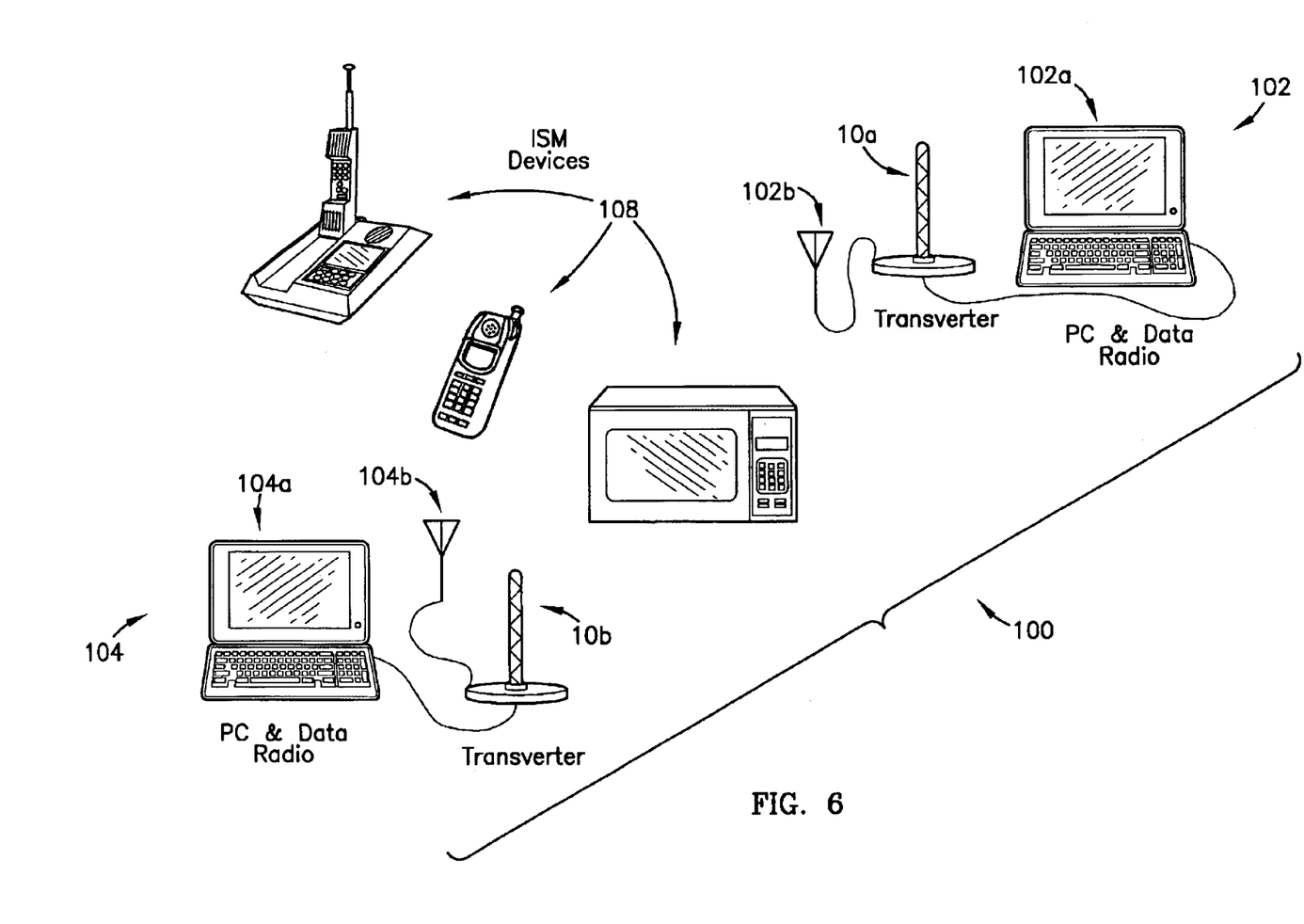
FIG. 6 is a diagram of a wireless communications link setup utilizing the frequency transverter of FIG. 1.
Figure 7:
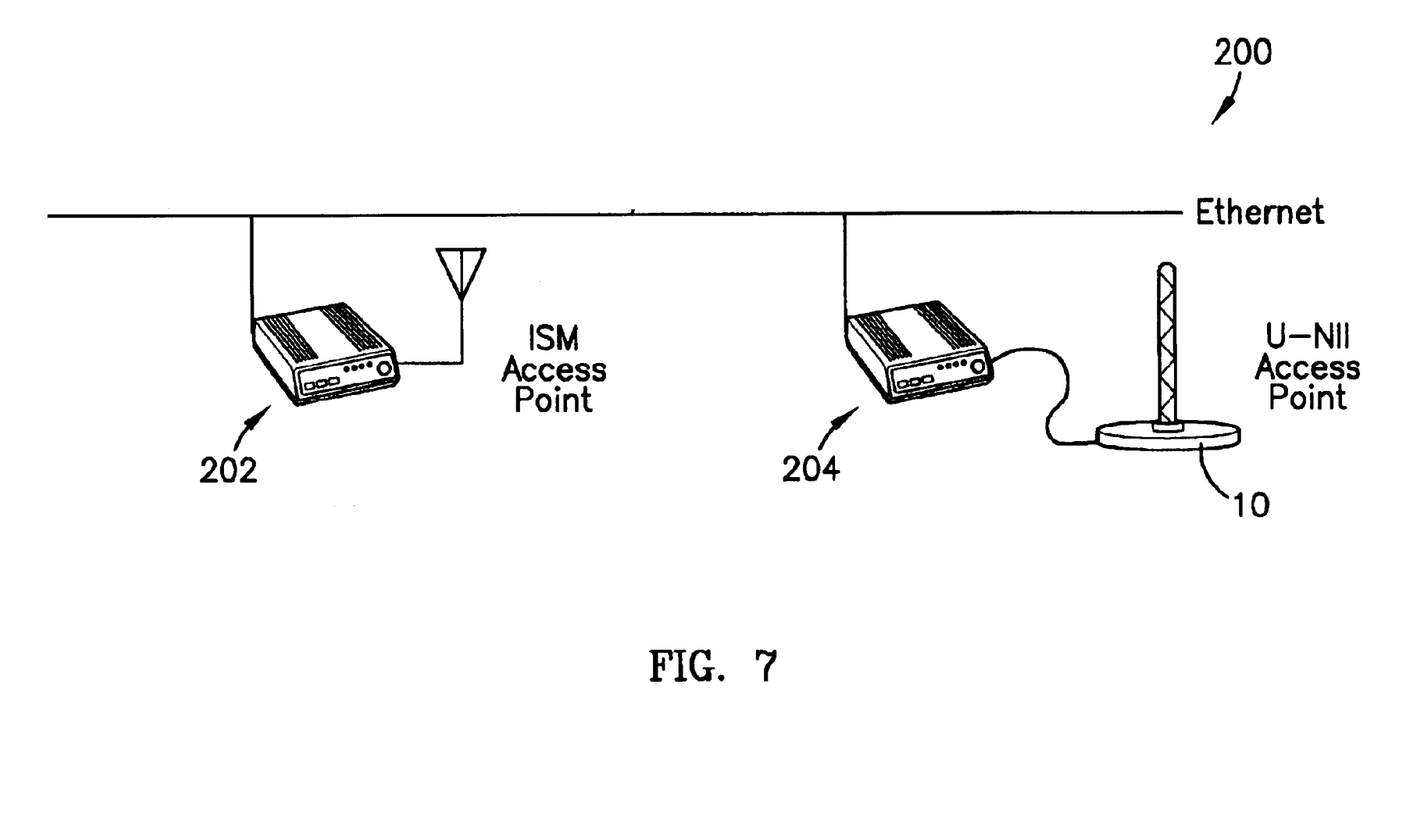
FIG. 7 is a block diagram of a fixed communications link setup utilizing the frequency transverter of FIG. 1.

In more detail, referring to FIGS. 4 and 5, the local oscillator 20 includes a phase-locked-loop (PLL) 64; a fundamental frequency amplifier 66; a frequency multiplier 68; a quadrature divider 70; and identical first and second narrow-band harmonic frequency amplifiers 72,74. The PLL 64 is operable to set the Local Oscillator frequency which determines how the ISM band is translated up/down to the U-NII band. This fundamental frequency is both selectable and programmable, thereby expanding the number of frequency bands that can be covered with the transverter 10. The output of the PLL 64 is connected to the input of the fundamental frequency amplifier 66. The output of the fundamental frequency amplifier 66 is connected to the input of the frequency multiplier 68. The frequency multiplier 68 is operable to reduce the input frequency of the PLL 64 to one-half of the LO frequency.

It will be appreciated that because the transmit mask is only −32 dBc at the first sidelobe, the first channel must be spaced greater than the mainlobe bandwidth of 11 MHz to ensure compliance with the band-edge spurious limit. The first channel will therefore be spaced 12 MHz from the lower band edge as in the 2.4 GHz ISM band. The data radio 11 has a frequency stability of less than 10 PPM over 10 ms in the reference oscillator, which is the FCC limit. The transverter 10 must have a stability which is better by a factor of two or three so that drift does not cause the sidelobes to increase outside the specified band. The phase noise of the data radio's RF VCO is specified as −86 dBc/Hz at 10 kHz offset in a 1 Hz bandwidth. To ensure that the transverter 10 does not add any additional noise that might cause jitter, the phase noise should be limited to 10 dB below that of the data radio. This is possible because the GaAs technology of the multiplier yields no measurable additive phase noise onto the multiplied local oscillator signal.

The output of the frequency multiplier 68 is connected to the input of the quadrature divider 70. Each of the two outputs of the quadrature divider 70 is connected to a different one of the first and second narrow band harmonic frequency amplifiers 72,74.

The first and second narrow band harmonic frequency amplifiers 72,74 are operable to increase the isolation between the transverter LO and the converter LO, and to provide a high drive level to the LO ports of the frequency conversion stages 38,54 of the both the transmuter 16 and the converter 18 to reduce conversion loss. The first and second narrow band harmonic frequency amplifiers 72,74 each include a high pass filter 72a,74a followed by an RF amplifier 72b,74b followed by a low-pass filter 72c,74c. The outputs of the low pass filters 72c,74c are connected to, respectively, the second input of the transmuter 16 and the second input of the converter 18.

The three-terminal output RF isolating device 22 is substantially identical to the input RF isolating device 14, described above, and is operable to electrically isolate the data radio from the receive signal. Furthermore, because amplifiers exposed to high load VSWRs will typically experience degradation in their linearity characteristics, the output RF isolating device 22 also serves to isolate the amplifier stage 42 of the transmuter 16 from a large load VSWR.

The three-terminal output RF isolating device 22 includes an input terminal, a first output terminal, and a second output terminal. The first input terminal is connected to the transmit output of the transmuter 16. The first output terminal is connected to the different frequency antenna 24. The second output terminal is connected to the receive input of the converter 18.

The antenna 24 is tuned to the second frequency band. The transverter 10 is able to use a single antenna to both transmit and receive because minimal isolation is required due to the built-in time offset of time division duplex (TDD) operation, described above.

The antenna 24 uses a standard helix design wherein wire is wound in a $\lambda$ circumference with $\frac{1}{4}\lambda$ pitch over a $\lambda$ diameter ground plane. This provides a 20% bandwidth covering all the U-NII bands, and between 6 dB and 20 dB of gain depending on the length. Polarization is both circular or linear. To determine the size of the ground plane required by the helix, one wavelength at 5.8 GHz is calculated as:

$$\lambda = c/f = 299.792458/5800 = 51.688 \text{ mm or } 2.03 \text{ inches}$$

This is less than the transverter's five inch diameter housing, described below, and can provide a ground plane for the U-NII antenna.

With regard to construction of the transverter 10, preferably all circuitry is integrated except the reference oscillator, the RF bandpass filters, and the power amplifier. The ICs are preferably constructed using an SiGe process technology wherein standard silicon is augmented with germanium to provide chips that are faster and use less power than non-augmented silicon chips. SiGe may be used for small-signal RF applications such as mixers or LNAs, and may also be used to implement highly integrated front ends. Currently, SiGe applications are likely to utilize speeds of less than 5 GHz. The robust 0.8 μm BiCMOS process can be used for RF designs up to 2 GHz. For higher frequencies, the SiGe HBT-CMOS process is available which is based on the proven 0.8 μm mixed-signal CMOS process and includes an additional high performance analog oriented heterojunction-bipolar-transistor module. Additionally, an SiGe:C process is being developed wherein a carbon dopant is injected into the SiGe layer during the epitaxial growth stage. The added carbon slows the diffusion of boron and yields improved control over the process, improved reproducibility, a higher early voltage characteristic, and higher base doping that provides a lower noise figure. The SiGe:C process may be used in primary RF front-end building blocks, including 5 GHz to 6 GHz applications, and key components using this process may include LNAs, mixers, voltage-controlled oscillators (VCOs), and transmitters. Another alternative involves an SiC process currently under development.

The transverter 10 is preferably packaged as a five inch diameter by one inch high package using double-stacked Duroid or Duroid/PWB composite with an internal aluminum ground plane. This configuration was chosen for using a microwave substrate with minimal warpage. The substrate material for the circuitry is preferably constructed of ceramic PTFE or another comparable product with a comparable dielectric constant. In contrast to using, for example, a generic FR-4 PCB material, use of the ceramic PTFE reduces the loss tangent by a factor of twelve, from 0.027 to 0.0023. The widths of RF lines were scaled according to the thickness of the dielectric and permittivity to obtain a 50 Ohm transmission line. A sleeve and tab design was used for the RF connectors and feedthroughs.

The transverter 10 has application, for example, in allowing novel wireless applications using existing microwave technologies to be applied to High Data Rate information transfer schemes such as Direct Sequence Spread spectrum (DSSS). The transverter 10 operates by segmenting PAN, LAN, and WAN into frequency diversity sub-bands with channel allocations. Space diversity is accomplished through power and antenna restrictions, which results in increased spectrum (300 MHz) and power and allows for more than three co-located channels per layer.

Deployment in the U-NII band is instrumental in meeting increasing demand for Internet access. Recent developments in a number of different digital technologies have greatly increased the need to transfer large amounts of data from one network or system to another. The transverter 10 of the present invention facilitates such data transfer by providing additional spectrum for unlicensed wideband operation, thereby allowing for the development of inexpensive broadband wireless networks which will benefit a vast number of users including, for example, educational, medial, business, and industrial users.

From the preceding description, it will be appreciated that the transverter 10 of the present invention provides a number of substantial advantages over prior art frequency translators, including making advantageous use of the U-NII band, which increases channel utilization and reuse, mitigates interference from other wireless devices, reduces ACI, and allows for smaller antenna dimensions.

Additionally, whereas prior art frequency translators were limited to three channels in simultaneous use at 11 Mbps within a 1000 foot radius using an omni-directional antenna, the transverter 10 advantageously provides more spectrum (300 MHz) and more power and allows for simultaneous use of more than three co-located channels per layer. The transverter 10 advantageously boosts the output power of the existing RF signal from the data radio up to one Watt, as allowed for by the FCC, which allows for an increase in transmission range at the second frequency band. Additionally, the transverter 10 advantageously avoids propagation path loss, which could otherwise degrade BER performance, by providing a reduced noise figure in the 5.7 GHz down-converter front end. Additionally, the transverter 10 advantageously provides a phase noise which is lower than that of the data radio 11, employs additional filtering to minimize spurious products, and uses an oscillator that is significantly more temperature stable than is used in the prior art. Additionally, power reduction criteria are imposed upon directional antennas with a gain above 6 dBi to reduce the potential for multiple devices to compete for spectrum in overlapping areas. Additionally, the transverter 10 connects between an existing data radio 11 and its existing antenna 30 and is therefore advantageously useable with legacy systems without substantial modification. Additionally, whereas the electronic circuitry of prior art translators is packaged near their RF or power source and away from the output antennas, the transverter 10 can be packaged in a housing that also serves as a ground plane of the second frequency band antenna. Additionally, whereas the circuitry of prior art frequency translators is typically constructed using a generic FR-4 PCB material which is undesirably lossy at 6 GHz, the circuitry of the transverter 10 is constructed using a ceramic PTFE substrate material or other material having a comparable dielectric constant. This advantageously reduces the loss tangent by a factor of 12, from 0.027 down to 0.0023. Relatedly, the widths of the RF lines are scaled according to the thickness and permittivity of the substrate material to result in 50 Ohm transmission lines.

Although the invention has been described with reference to the preferred embodiments illustrated in the attached drawings, it is noted that equivalents may be employed and substitutions made herein without departing from the scope of the invention as recited in the claims. For example, though described herein as being operable to translate between the ISM and U-NII bands, the transverter 10 is readily adaptable for use in translating to or from other bands, and should therefore be considered independent of any particular first and second frequency bands. Furthermore, it will be appreciated that one with ordinary skill in the electronic arts may utilize different but operatively equivalent components than those described herein to practice the transverter 10, and these equivalent components should therefore be considered to be within the contemplated scope of the present invention.

Having thus described the preferred embodiment of the invention, what is claimed as new and desired to be protected by Letters Patent includes the following:

1. A transverter operable to translate a transmit signal and a receive signal between a first frequency band and a second frequency band, wherein the transverter is connected between a data radio and an existing antenna tuned to the first frequency band, the transverter comprising:
    a bandswitch interposed between the data radio and the existing antenna and adapted to allow for selectively directing the transmit signal from the data radio to the existing antenna, thereby substantially bypassing the transverter;
    an input isolating device connected to the bandswitch and adapted to electrically isolate one or more components of the transverter from the data radio;
    a transmuter connected to the input isolating device and adapted to translate the transmit signal from the first frequency band to the second frequency band;
    a converter connected to the input isolating device and adapted to translate the receive signal from the second frequency band to the first frequency band;
    a dual output local oscillator connected to both the transmuter and the converter and adapted to provide a drive level thereto;
    an output isolating device connected to both the transmuter and the converter and adapted to electrically isolate the transverter; and
    an antenna connected to the output isolating device and tuned to the second frequency band and adapted to transmit the transmit signal and to receive the receive signal,
    wherein the input isolating device and the output isolating device are each a Y-junction ferrite device configured as a three-port circulator device adapted to provide a non-reciprocal effect, and
    wherein the input isolating device and the output isolating device each exhibit a third order symmetry behavior.

2. A transverter operable to translate a transmit signal and a receive signal between a first frequency band and a second frequency band, wherein the transverter is connected between a data radio and an existing antenna tuned to the first frequency band, the transverter comprising:
    a bandswitch interposed between the data radio and the existing antenna and adapted to allow for selectively directing the transmit signal from the data radio to the existing antenna, thereby substantially bypassing the transverter;
    an input isolating device connected to the bandswitch and adapted to electrically isolate one or more components of the transverter from the data radio;
    a transmuter connected to the input isolating device and adapted to translate the transmit signal from the first frequency band to the second frequency band;
    a converter connected to the input isolating device and adapted to translate the receive signal from the second frequency band to the first frequency band;
    a dual output local oscillator connected to both the transmuter and the converter and adapted to provide a drive level thereto;
    an output isolating device connected to both the transmuter and the converter and adapted to electrically isolate the transverter; and
    an antenna connected to the output isolating device and tuned to the second frequency band and adapted to transmit the transmit signal and to receive the receive signal,
    wherein the transmuter includes a first input terminal and a second input terminal, and further includes—
        an attenuator adapted to receive the transmit signal from the input isolating device and to attenuate the transmit signal and to allow for adjusting throughput gain between the first input terminal and the second input terminal, and further adapted to provide a broadband match for both the input isolating device and the data radio,
        a frequency conversion device following the attenuator and adapted to translate the attenuated transmit signal from the first frequency band to the second frequency band,
        a bandpass filter following the frequency conversion device and adapted to filter the transmit signal to substantially remove an undesirable signal element,
        an amplifier stage following the bandpass filter and adapted to amplify the transmit signal, and
        a low-pass filter following the amplifier stage and adapted to filter the transmit signal to reduce a spurious element above the second frequency band.

3. The transverter as set forth in claim 2, wherein the attenuator of the transmuter has an attenuation value of at least 10 dB.

4. The transverter as set forth in claim 2, wherein the frequency conversion device of the transverter includes a double-balanced mixer having sufficient drive power to minimize a conversion loss to less than 10 dB.

5. The transverter as set forth in claim 2, wherein the amplifier stage of the transmuter is a GaAs device operable to provide approximately 1 Watt of output power.

6. A transverter operable to translate a transmit signal and a receive signal between a first frequency band and a second frequency band, wherein the transverter is connected between a data radio and an existing antenna tuned to the first frequency band, the transverter comprising:
    a bandswitch interposed between the data radio and the existing antenna and adapted to allow for selectively directing the transmit signal from the data radio to the existing antenna, thereby substantially bypassing the transverter;
    an input isolating device connected to the bandswitch and adapted to electrically isolate one or more components of the transverter from the data radio;

a transmuter connected to the input isolating device and adapted to translate the transmit signal from the first frequency band to the second frequency band;

a converter connected to the input isolating device and adapted to translate the receive signal from the second frequency band to the first frequency band, wherein a noise figure characteristic of the converter is matched to a path loss difference between the first frequency band and the second frequency band;

a dual output local oscillator connected to both the transmitter and the converter and adapted to provide a drive level thereto;

an output isolating device connected to both the transmuter and the converter and adapted to electrically isolate the transverter; and an antenna connected to the output isolating device and tuned to the second frequency band and adapted to transmit the transmit signal and to receive the receive signal.

7. The transverter as set forth in claim 6, wherein the first frequency band is approximately 2.4 GHz, and the second frequency band is approximately between 5.0 GHz and 6.0 GHz.

8. The transverter as set forth in claim 6, wherein both the transmit signal and the receive signal include digitally encoded data modulated onto an RF carrier.

9. The transverter as set forth in claim 6, wherein both the transmit signal and the receive signal have time division duplex characteristics.

10. The transverter as set forth in claim 6, wherein the bandswitch is a single-pull double-throw absorptive switch adapted to provide low insertion loss, high linearity, and high isolation between the first frequency band and the second frequency band.

11. The transverter as set forth in claim 6, wherein the bandswitch includes a one-bit control line adapted for controlling the directing of the transmit signal from the data radio to the existing antenna.

12. The transverter as set forth in claim 6, wherein both the input isolating device and the output isolating device each provide electrical isolation of approximately between 15 dB and 20 dB.

13. The transverter as set forth in claim 6, wherein the input isolating device has a narrowband design operable to reduce a lower frequency spurious element from the transmit signal.

14. The transverter as set forth in claim 6, wherein the input isolating device has a drop-in microstrip design operable to facilitate placement directly on a substrate material.

15. The transverter as set forth in claim 6, wherein the transverter is provided as a 5 inch diameter by 1 inch high package using a double-stacked material with an internal aluminum ground plane.

16. The transverter as set forth in claim 6, wherein at least a portion of the transverter is constructed using a ceramic PTFE substrate.

17. A transverter operable to translate a transmit signal and a receive signal between a first frequency band and a second frequency band, wherein the transverter is connected between a data radio and an existing antenna tuned to the first frequency band, the transverter comprising:

a bandswitch interposed between the data radio and the existing antenna and adapted to allow for selectively directing the transmit signal from the data radio to the existing antenna, thereby substantially bypassing the transverter;

an input isolating device connected to the bandswitch and adapted to electrically isolate one or more components of the transverter from the data radio;

a transmuter connected to the input isolating device and adapted to translate the transmit signal from the first frequency band to the second frequency band;

a converter connected to the input isolating device and adapted to translate the receive signal from the second frequency band to the first frequency band;

a dual output local oscillator connected to both the transmuter and the converter and adapted to provide a drive level thereto;

an output isolating device connected to both the transmuter and the converter and adapted to electrically isolate the transverter; and an antenna connected to the output isolating device and tuned to the second frequency band and adapted to transmit the transmit signal and to receive the receive signal, wherein the converter includes— a bandpass filter adapted to filter the receive signal to substantially remove an undesirable signal element, a low noise amplifier stage following the bandpass filter and adapted to amplify the receive signal, and further adapted to provide a low noise figure and an additional gain at the second frequency band, a frequency conversion stage following the low noise amplifier stage and adapted to translate the receive signal from the second frequency band to the first frequency band, a low-pass filter stage following the frequency conversion stage and adapted to filter the amplified receive signal to reduce a spurious element outside the second frequency band, an amplifier stage following the low-pass filter stage and adapted to amplify the translated receive signal, and an attenuator following the amplifier stage and adapted to reduce a total gain through the converter.

18. The transverter as set forth in claim 17, wherein the low noise amplifier stage of the converter includes a pHEMT device with excellent low-noise characteristics at microwave frequencies.

19. A transverter operable to translate a transmit signal and a receive signal between a first frequency band and a second frequency band, wherein the transverter is connected between a data radio and an existing antenna tuned to the first frequency band, the transverter comprising:

a bandswitch interposed between the data radio and the existing antenna and adapted to allow for selectively directing the transmit signal from the data radio to the existing antenna, thereby substantially bypassing the transverter;

an input isolating device connected to the bandswitch and adapted to electrically isolate one or more components of the transverter from the data radio;

a transmuter connected to the input isolating device and adapted to translate the transmit signal from the first frequency band to the second frequency band;

a converter connected to the input isolating device and adapted to translate the receive signal from the second frequency band to the first frequency band;

a dual output local oscillator connected to both the transmuter and the converter and adapted to provide a drive level thereto;

an output isolating device connected to both the transmuter and the converter and adapted to electrically isolate the transverter; and an antenna connected to the output isolating device and tuned to the second frequency band and adapted to transmit the transmit signal and to receive the receive signal, wherein the dual output local oscillator is adapted to generate an LO signal, the dual output local oscillator including—
- a phase-locked-loop adapted to set a fundamental frequency of the LO signal, wherein the fundamental frequency determines how translation occurs between the first frequency band and the second frequency band,
- a fundamental frequency amplifier adapted to amplify the LO signal,
- a frequency multiplier adapted to reduce the fundamental frequency of the LO signal by one-half, and
- first and second narrow-band harmonic frequency amplifiers adapted to provide the LO signal to both the transmuter and the converter while increasing electrical isolation between the transverter and the converter.

20. The transverter as set forth in claim 19, wherein the first and second narrow-band harmonic frequency amplifiers each include a high pass filter followed by an RF amplifier followed by a low-pass filter.

21. A transverter operable to translate a transmit signal and a receive signal between a first frequency band and a second frequency band, wherein the transverter is connected between a data radio and an existing antenna tuned to the first frequency band, the transverter comprising:

a bandswitch interposed between the data radio and the existing antenna and adapted to allow for selectively directing the transmit signal from the data radio to the existing antenna, thereby substantially bypassing the transverter;

an input isolating device connected to the bandswitch and adapted to electrically isolate one or more components of the transverter from the data radio;

a transmuter connected to the input isolating device and adapted to translate the transmit signal from the first frequency band to the second frequency band;

a converter connected to the input isolating device and adapted to translate the receive signal from the second frequency band to the first frequency band;

a dual output local oscillator connected to both the transmuter and the converter and adapted to provide a drive level thereto;

an output isolating device connected to both the transmuter and the converter and adapted to electrically isolate the transverter; and an antenna connected to the output isolating device and tuned to the second frequency band and adapted to transmit the transmit signal and to receive the receive signal, wherein the antenna has a standard helix design wherein wire is wound in a $\lambda$ circumference with a $\frac{1}{4}\lambda$ pitch over a $\lambda$ diameter ground plane to provide a bandwidth covering substantially the entire second frequency band, and further providing approximately between 6dB and 20dB of gain.

* * * * *